(12) United States Patent
Rippingale

(10) Patent No.: US 6,304,163 B1
(45) Date of Patent: Oct. 16, 2001

(54) RADIALLY MAGNETIZED PLASTIC PIPE

(76) Inventor: John B. Rippingale, 40768 Manor House Rd., Leesburg, VA (US) 20175

( * ) Notice: Subject to any disclaimer, the term of this patent is extended or adjusted under 35 U.S.C. 154(b) by 0 days.

(21) Appl. No.: 09/546,561

(22) Filed: Apr. 11, 2000

Related U.S. Application Data

(62) Division of application No. 09/037,979, filed on Mar. 9, 1998, now Pat. No. 6,084,459.

(51) Int. Cl.[7] ............................. H01F 3/00; H01F 7/02; G01V 3/08
(52) U.S. Cl. .................... 335/303; 335/302; 335/306; 324/326
(58) Field of Search ............................ 335/302, 306; 324/326

(56) References Cited

U.S. PATENT DOCUMENTS

| | | | |
|---|---|---|---|
| 4,764,743 | * 8/1988 | Leupold et al. | 335/306 |
| 4,862,128 | * 8/1989 | Leupold | 335/306 |
| 4,952,331 | * 8/1990 | Okimoto et al. | 252/62.54 |
| 5,017,873 | * 5/1991 | Rippingale et al. | 324/326 |
| 5,030,937 | * 7/1991 | Loubier et al. | 335/303 |
| 5,036,210 | * 7/1991 | Goodman | 235/493 |
| 5,055,812 | * 10/1991 | Abele et al. | 335/210 |
| 5,321,361 | * 6/1994 | Goodman | 324/326 |

* cited by examiner

*Primary Examiner*—Ramon M. Barrera
(74) *Attorney, Agent, or Firm*—Roland H. Shubert

(57) ABSTRACT

A magnetically detectable plastic pipe that can be located and identified when buried in earth is provided. The pipe contains particles of a ceramic ferrite which are magnetically polarized radially in the pipe in a helical pattern which periodically repeats along the pipe length.

8 Claims, 12 Drawing Sheets

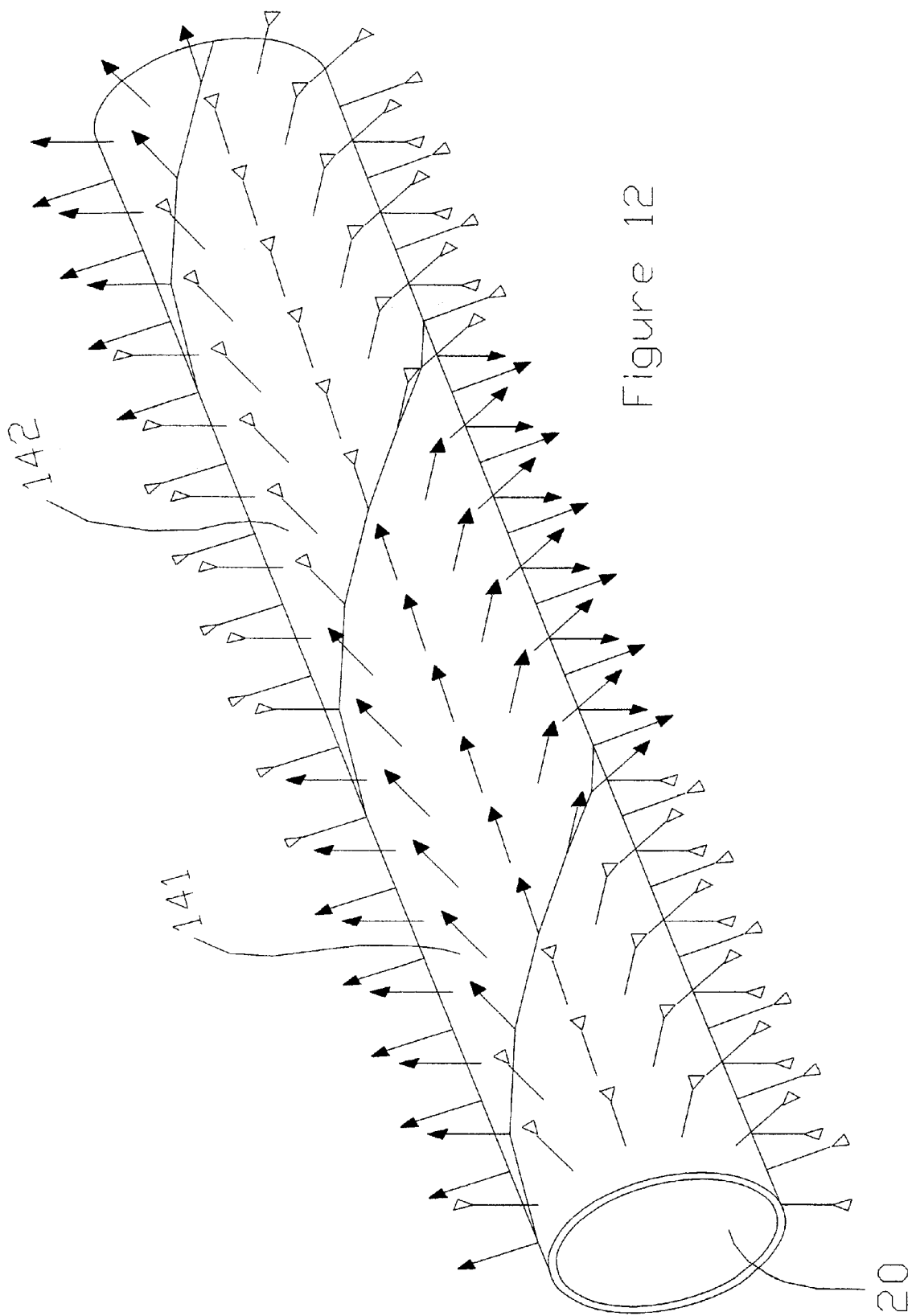

RADIALLY MAGNETIZED PLASTIC PIPE

This application is a division of U.S. patent application Ser. No. 09/037,979, filed Mar. 9, 1998, now U.S. Pat. No. 6,084,459.

BACKGROUND OF THE INVENTION

1. Field of the Invention

The present invention pertains to providing locatable identification of non-metallic secreted objects and continuous lines and more particularly to providing and to locating non-metallic objects, such as buried plastic pipe so that they can easily be located and their path traced without disturbing the objects.

2. Description of the Related Art

In general, identification of buried non-metallic objects, such as duct pipe and fiber optic transmission lines, include magnetic lines located helically around non-metallic ducts to identify non-metallic objects buried beneath the surface. Almost all provide for an elongated magnetic device that is magnetized transverse to its length. The following patents represent the state of the art in providing magnetic type of identification for buried objects or transmission lines.

U.S. Pat. No. 5,006,806, titled "Methods and Apparatus Employing Permanent Magnets for Marking, Locating, Tracing and Identifying Hidden Objects Such as Buried Fiber Optic Cables", issued to John B. Rippingale, et al. relates to providing elongated permanent magnet identifier devices having magnetic fields that may be detected at a distance from the objects. In one embodiment the identifier device comprises an elongated strip magnetized in the direction of its width and formed into a long pitch helix, producing a characteristic "magnetic field signature" that enhances detection and identification of the object, as by a portable gradiometer that is moved over the surface of the earth along a line generally parallel to the length of the object. This embodiment may provide a magnetic field that diminishes as the square of the distance from the identifier device (rather than the usual cube of the distance,) thereby enabling detection at substantial distances. In a second embodiment, distinctive magnetic field signatures are produced by arrays of spaced permanent magnets, the fields of which add and subtract to provide resultant magnetic fields with both peaks and valleys along a line generally parallel to the length of the object.

U.S. Pat. No. 5,051,034, titled "Magnetically Detectable Plastic Pipe," issued to William G. Goodman, relates to a magnetically detectable plastic pipe, such as polyethylene, polyvinyl, etc., for underground use that includes a hollow tubular plastic pipe having particles of magnetic material embedded in plastic and secured integrally with the wall of the pipe. The magnetic particles are of iron oxide or barium ferrite and of a size, shape, distribution and proportion such that the plastic pipe may be easily detected by magnetic detection apparatus on the surface when the plastic pipe is buried at a selected depth under the ground. The magnetic particles are uniformly distributed throughout the thickness and uniformly distributed around the entire circumference of the plastic pipe, or the magnetic particles may be distributed in discrete portions of the plastic pipe, as for example, a uniform outer layer of the pipe, or in stripes or strips extending along the pipe. The particles may be extruded with the plastic in forming the pipe, whether uniformly dispersed or in discrete regions, or the pipe may be formed of plastic free of the magnetic particles and the magnetic particles provided in a layer separately adhered to the wall of the pipe. The magnetic strips or magnetic portions of the plastic pipe may have selected areas or portions magnetized to encode information readable from the surface of the ground above the buried pipe or in inventorying pipe on the surface.

U.S. Pat. No. 5,321,361, titled "Apparatus and Method for Directing Magnetically Detectable Plastic Pipe and Other Sources of Magnetic Fields From a Distance Using a Vertically Aligned Gradiometer on a Horizontal Support," issued to William G. Goodman, relates to an apparatus for manipulation by an operator or user for detecting magnetically detectable plastic pipe and other sources of magnetic fields from a distance. This apparatus has a horizontally oriented support member with a handle extending at an acute angle therefrom. A magnetic field gradiometer comprising a hollow non-magnetic tube with two flux gate magnetometers therein is supported at the distal end of the support member a substantial distance ahead of the operator in a substantially vertical position. The support member includes a microprocessor operatively connected through a differential amplifier to the gradiometer for processing signals therefrom. An electronic read out module is supported on the handle spaced from the gradiometer and operable to receive signals from the microprocessor and convert them into an audible or visual display to be sensed by the operator or user. The size and weight distribution of the apparatus and the angles at which the components are assembled assure that when the apparatus is hand held by the handle the gradiometer is balanced in a vertical position at a substantial distance ahead of the operator or user. An alternate embodiment, a magnetic field mapper, is illustrated having a plurality of gradiometers supported in parallel on supporting wheels and having the visual and audio display in the form of a laptop or notebook type computer supported on the handle for the wheeled apparatus. A hand held embodiment of the mapper is also discussed.

SUMMARY OF THE INVENTION

The present invention provides a method and apparatus for polarizing ceramic ferrite with an approximate radial pattern in a non-conductive pipe. The method includes providing two oppositely polarized magnets, each having an arcuate shaped side facing each other to form a generally circular opening. A permanent magnet is suspended within the generally circular opening so that the permanent magnet does not come in contact with the two oppositely polarized magnets. In this manner an annular space is formed between the generally circular opening and the suspended permanent magnet. A non-conductive pipe is passed through the annular space. The apparatus for polarizing ceramic ferrite in a non-conductive pipe includes two oppositely polarized magnets, each having an arcuate shaped side facing each other to form a generally circular opening. A permanent magnet is placed within the generally circular opening so that the permanent magnet does not come in contact with the two oppositely polarized magnets thus forming an annular space therebetween. A centering device associated with the permanent magnet is provided to permit non-conductive pipe to pass through the annular space with the permanent magnet within the non-conductive pipe.

An apparatus for centering a permanent magnet between two oppositely polarized fixed magnets is also disclosed. This apparatus includes a hinge extending from one side of each of the two fixed magnets. An arm is connected to the hinge at one end, this arm having a first biasing member pushing the arm away from the fixed magnet. A spacer device is connected to another end of the arm. The spacer device is in contact with the permanent magnet to position the permanent magnet with respect to the fixed magnets. The spacer device has a second biasing member pushing the spacer from the arm. A second hinge extends from another side of each of the two fixed magnets. A spacer arm is connected to the second hinge. The spacer arm has a first end for positioning the permanent magnet with respect to the fixed magnets. The spacer arm has a third biasing member pushing a second end of the spacer arm from the fixed magnet to which the hinge is attached.

A magnetically identified non-conductive pipe is produced using the method and apparatus for polarizing ceramic ferrite in a non-conductive pipe. The non-metallic pipe contains a predetermined percentage by weight of a ceramic ferrite. The ceramic ferrite is polarized radially in the pipe. The radial polarization has a maximum north pole and a maximum south pole. The poles wind around the exterior of the pipe, periodically concluding a complete revolution.

BRIEF DESCRIPTION OF THE DRAWINGS

FIG. 12 is an oblique view of a length of pipe depicting the magnetic field displayed by a radially magnetized plastic pipe in accordance with this invention.

DETAILED DESCRIPTION OF THE INVENTION

The present invention provides a method for polarizing ceramic ferrite in a non-conductive pipe. The method and apparatus of the present invention includes providing two oppositely polarized magnets, each having an arcuate shaped side facing each other to form a generally circular opening. In cooperation with these two oppositely polarized magnets, a permanent magnet is suspended within the generally circular opening so that the permanent magnet does not come in contact with the two oppositely polarized magnets. The permanent magnet is sized so that its outer circumference is smaller than the circumference of the generally circular opening defined by the two oppositely polarized magnets. In this manner an annular space is formed between the generally circular opening and the suspended permanent magnet. A non-conductive pipe, having an inner circumference greater than that of the suspended permanent magnet and an outer circumference less than that of the generally circular opening, is passed through the annular space.

The apparatus for polarizing ceramic ferrite in a non-conductive pipe includes two oppositely polarized magnets, each having an arcuate shaped side facing each other to form a generally circular opening. A permanent magnet is suspended within the generally circular opening. This permanent magnet is sized so that it has an outer circumference smaller than the circumference of the generally circular opening defined by the arcuate shaped sides of the two oppositely polarized magnets. In this manner the permanent magnet does not come in contact with the two oppositely polarized magnets thus forming an annular space therebetween. This annular space has inner and outer diameters sized to permit a non-conductive pipe having a predetermined concentration of a ceramic ferrite within its walls to pass through the space.

The permanent magnet suspended between the two oppositely polarized magnets is shaped at one end so that its outer diameter gradually reduces. This gives the ends of the permanent magnet a bullet head shape to allow easy insertion into the non-conductive pipe when the pipe is passed through the magnetic radial field created by the combination of the two oppositely polarized magnets and the center suspended permanent magnet. A centering device acts in cooperation with the shape of the permanent magnet to permit non-conductive pipe to pass through the annular space with the permanent magnet within the non-conductive pipe. The centering device is spring loaded to hold the permanent magnet in position centered between the two oppositely polarized magnets while withdrawing when pressure is applied to allow the non-conductive pipe to slide in the space between the permanent magnet and the two oppositely polarized magnets.

Figure 1:
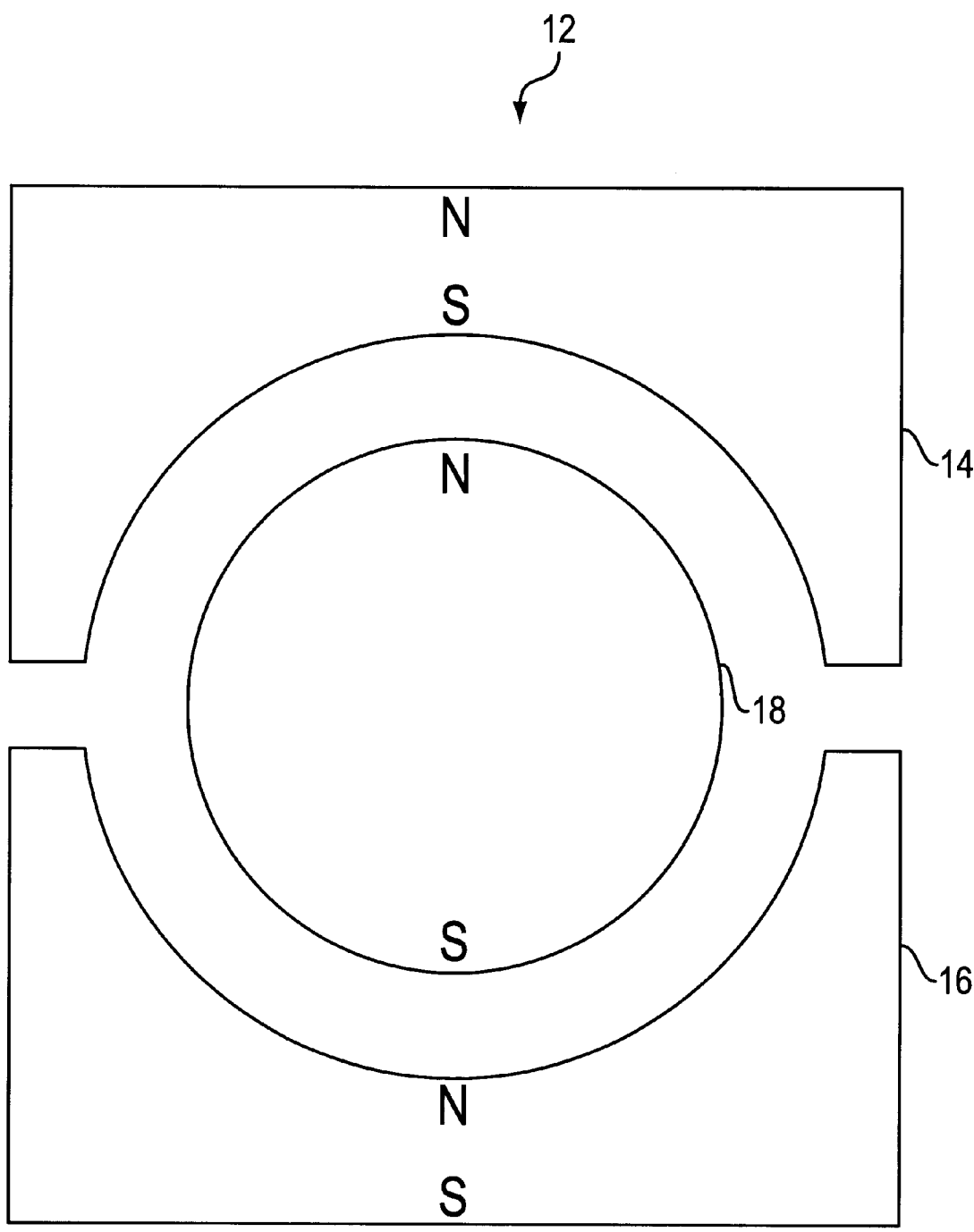
FIG. 1 is an end view of a first embodiment of a radial magnetizing device.

Referring now to FIG. 1, a cross sectional view of radial magnetizing device 12 is illustrated as having two fixed magnets 14 and 16 with a central floating magnet 18. In the preferred embodiment fixed magnets 14 and 16 are permanent magnets, however, in this position, electromagnets may be used. If electromagnets are used, the flux fields are not as reliable and modifications the arrangement may be necessary. For example, an arrangement using electromagnets will need slip rings to provide power while the electromagnets rotate. Further, electromagnets need capacitors to charge up to provide the necessary power and capacitors deteriorate with use. Central floating magnet 18 is preferably a permanent magnet, however, any suitable magnetic arrangement may be used to strengthen the flux fields of fixed magnets 14 and 16 while providing radial magnetization.

Figure 2:
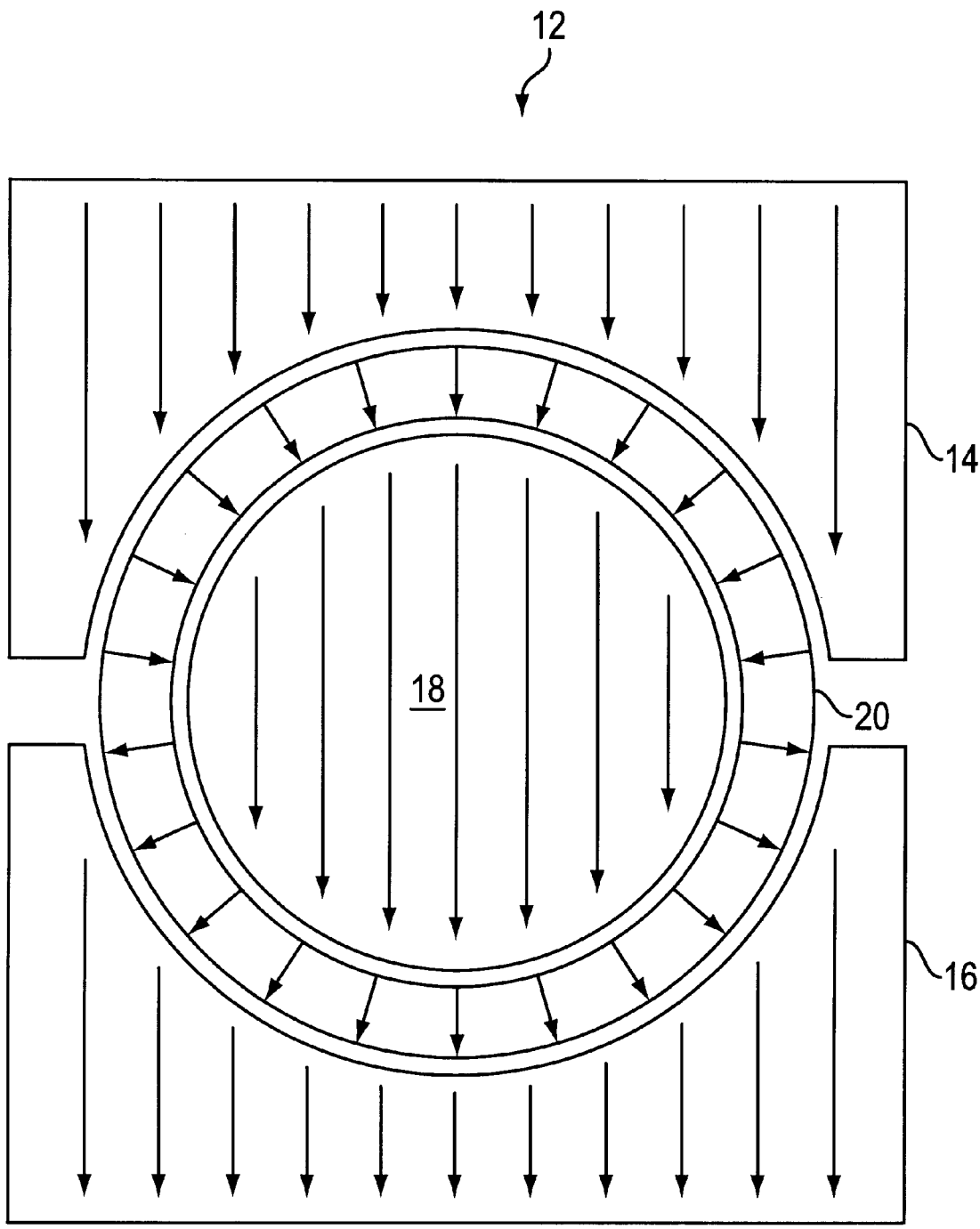
FIG. 2 is an illustration of the magnetizing flux lines of the radial magnetizing device of FIG. 1.

In FIG. 2 the ideal flux lines of the radial magnetization system of FIG. 1 are illustrated as operating on pipe 20. In the ideal situation, flux lines travel between fixed magnets 14 and 16 and central floating magnet 18. At the point where fixed magnets 14 and 16 are closest to each other, fringing occurs and the flux lines bend around the edges. In the magnetization of pipe 20, this is the point that the transition, where the north pole switches to the south pole, occurs.

Pipe 20 may be any non-conductive pipe currently in use in the art. However, in the present application, pipe 20 is preferably recently extruded plastic pipe with a ceramic ferrite content of anywhere from one percent to twenty four percent by weight. In the preferred embodiment, the ceramic ferrite is approximately twelve percent. Also in the preferred embodiment, the ceramic ferrite may be either barium ferrite or strontium ferrite.

In the magnetization process, radially magnetizing device 12 is rotated either clockwise or counter-clockwise as pipe 20 is extruded to place the radial magnetization in the pipe in a helical configuration. The helix repeats preferably every twelve feet, however, any repetition pattern may be used as long as the north and south sectors are placed at different locations along the circumference of the pipe as it lays in a line.

Figure 3:
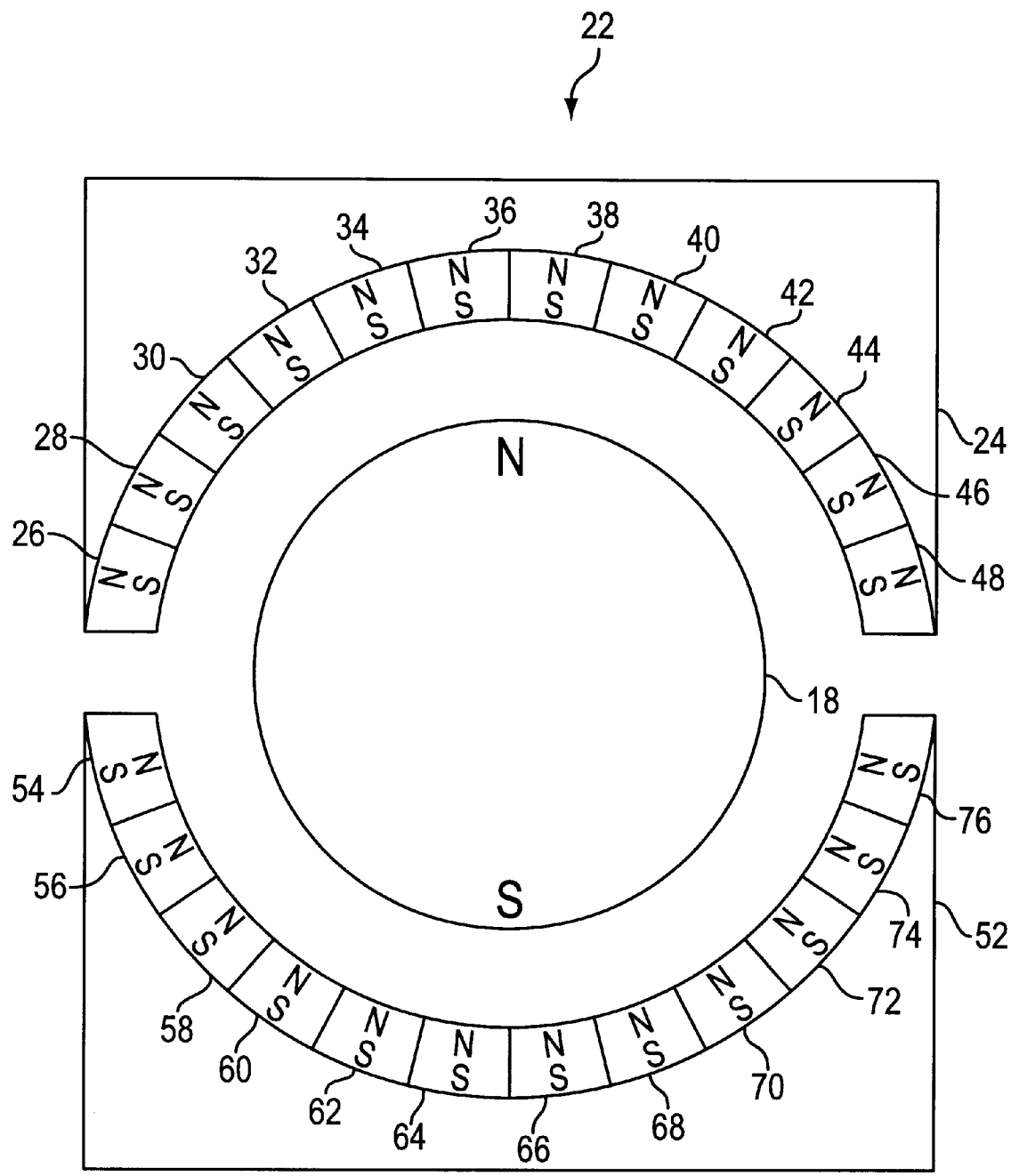
FIG. 3 is an end view of a second embodiment of a radial magnetizing device.

Referring now to FIG. 3, an end view of a second embodiment of a radial magnetizing device 22 is illustrated as having a fixed magnet assembly 24 with a plurality of permanent magnets 26 through 48 and fixed magnet assembly 52 with a plurality of permanent magnets 54 through 76. In this embodiment, central floating magnet 20 remains the same, a single piece having a north pole and a south pole on the outer perimeter of permanent magnet 18.

Fixed magnet assembly 24 and fixed magnet assembly 52 are both illustrated as having twelve individual magnets per assembly. Although this is the preferred arrangement, any number may be used as long as it provides sufficient flux strength to accomplish magnetization of the ceramic ferrite in pipe 20. Additionally, the number of individual magnets in assembly 24 may be different from the number of individual magnets in assembly 52, as long as the magnetization of pipe 20 can be effected.

Figure 4:
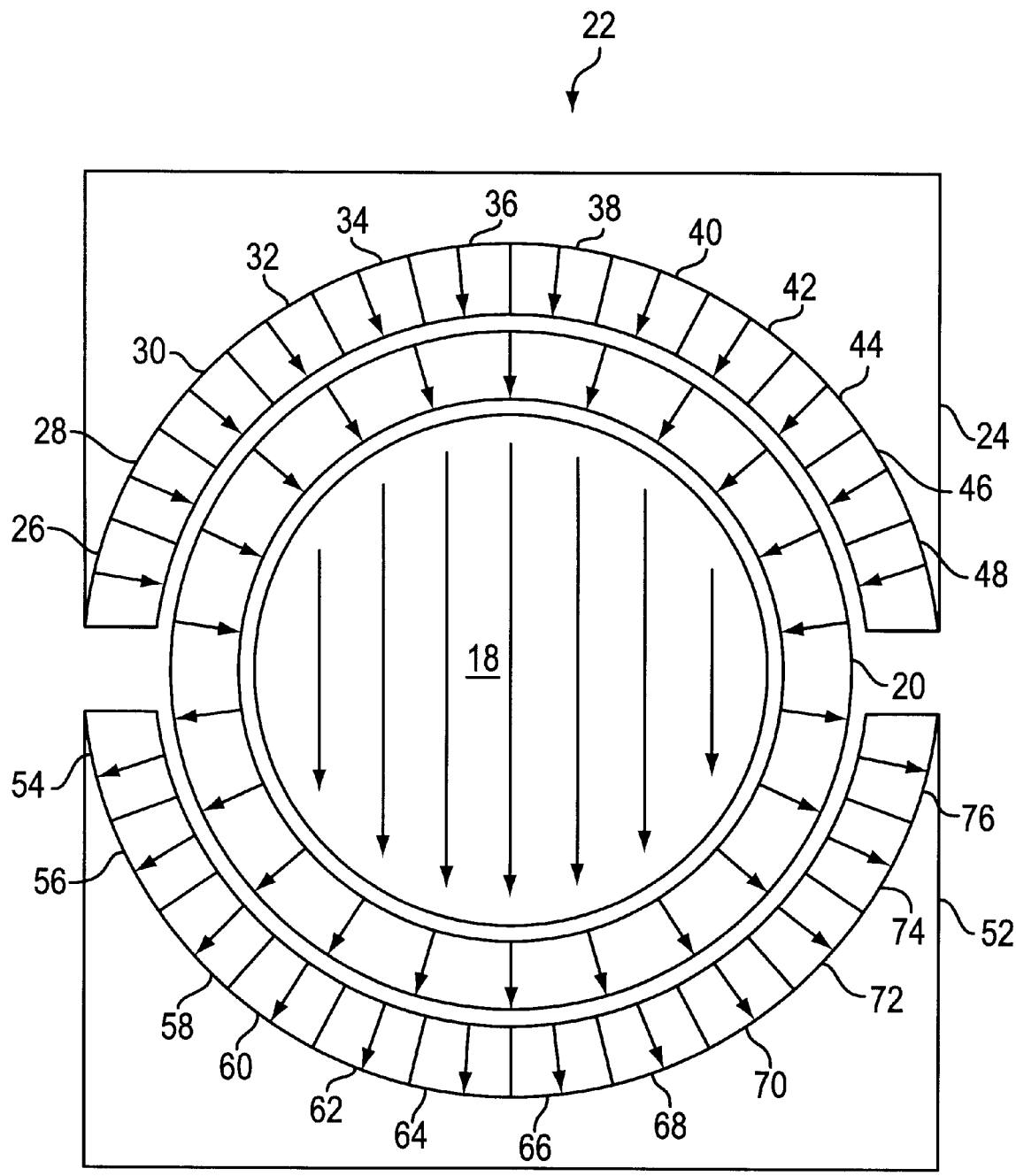
FIG. 4 is an illustration of the magnetizing flux lines of the radial magnetizing device of FIG. 3.

FIG. 4 is an illustration of the magnetizing flux lines of the radially magnetizing device of FIG. 3. In this embodiment, the radial magnetization is illustrated even more clearly. Flux lines travel between each of the individual magnets 26–48 of magnet assembly 24 and floating magnet 18 and between individual magnets 54–76 of magnet assembly 52 and floating magnet 18. As indicated in conjunction with FIG. 2, pipe 20 may be any non-conductive pipe currently in use in the art. However, in this embodiment as with the previous embodiment, pipe 20 is preferably recently extruded plastic pipe with a ceramic ferrite content of anywhere from one percent to twenty four percent by weight. In the preferred embodiment the ceramic ferrite is approximately twelve percent. Also, in the preferred embodiment, the ceramic ferrite may be either barium ferrite or strontium ferrite.

In the magnetization process, radially magnetizing device 22 is rotated either clockwise or counter-clockwise, similar to the rotation process described in conjunction with radially magnetizing device 12, as pipe 20 is extruded to place the radial magnetization in a helical configuration. As stated previously, the helix repeats preferably every twelve feet. However, any repetition pattern may be used as long as the north and south sectors are placed at different locations along the circumference of the pipe as it lays in a straight line.

Figure 5:
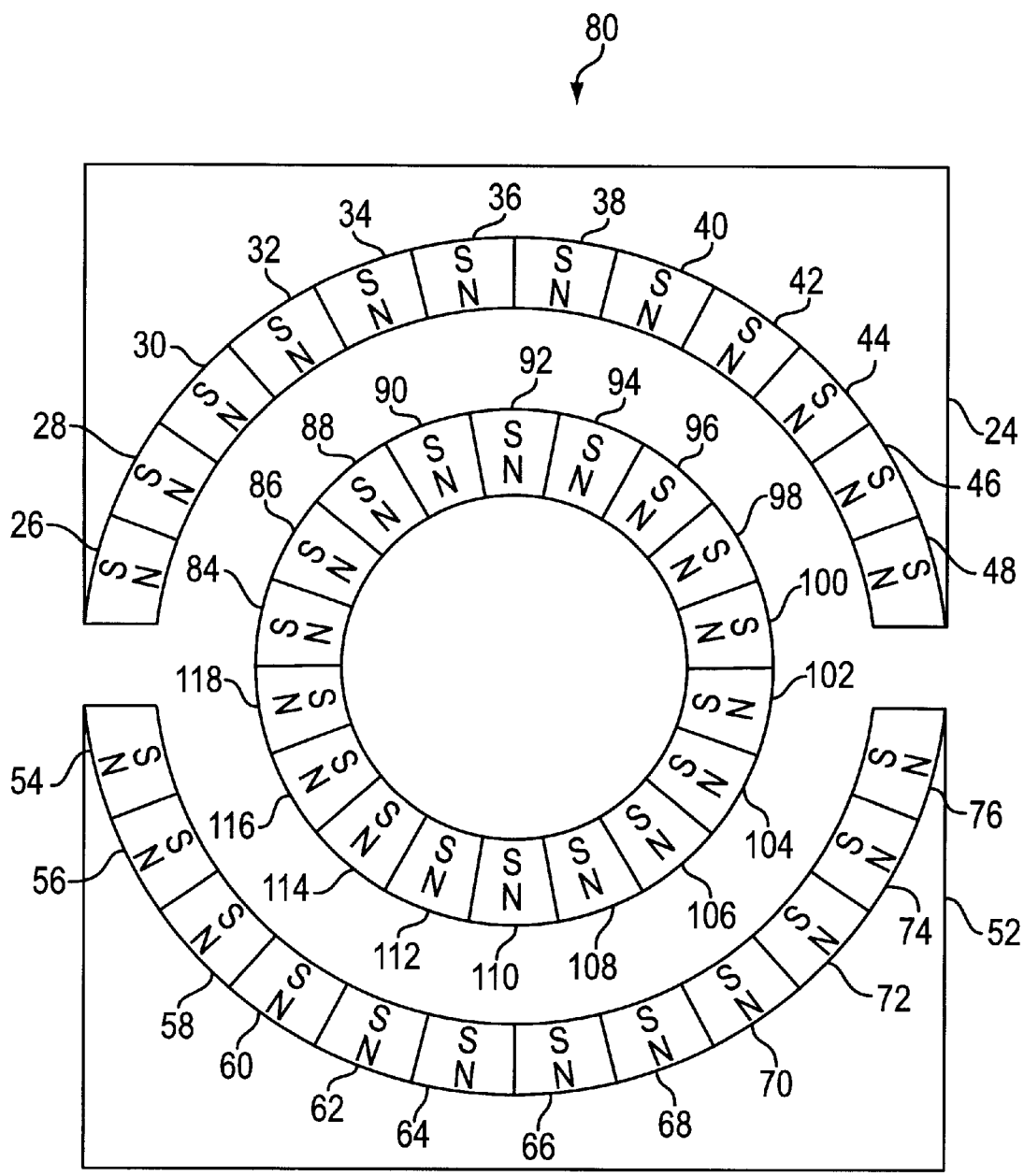
FIG. 5 is an end view of a third embodiment of a radial magnetizing device.

Referring now to FIG. 5, radial magnetizing device 80 is illustrated as having fixed magnet assembly 24 with a plurality of permanent magnets 26 through 48 and fixed magnet assembly 52 with a plurality of permanent magnets 54 through 76. In this embodiment, central floating magnet 20 is replaced by central magnet assembly 82 having a plurality of individual magnets 84 through 118. In the preferred embodiment, the first nine individual magnets 84 through 100 are illustrated having their north pole facing outward. The second nine individual magnets 102 through 118, have their south pole facing outward. This arrangement is preferred, however, different numbers of magnets may be used as long as the pole designations are compatible with the opposing poles on fixed magnet assemblies 24 and 52. For example, central magnet assembly 82 may have the same number of individual magnets as fixed magnet assemblies 24 and 52, twelve facing in one direction and twelve facing in the other direction.

Figure 6:
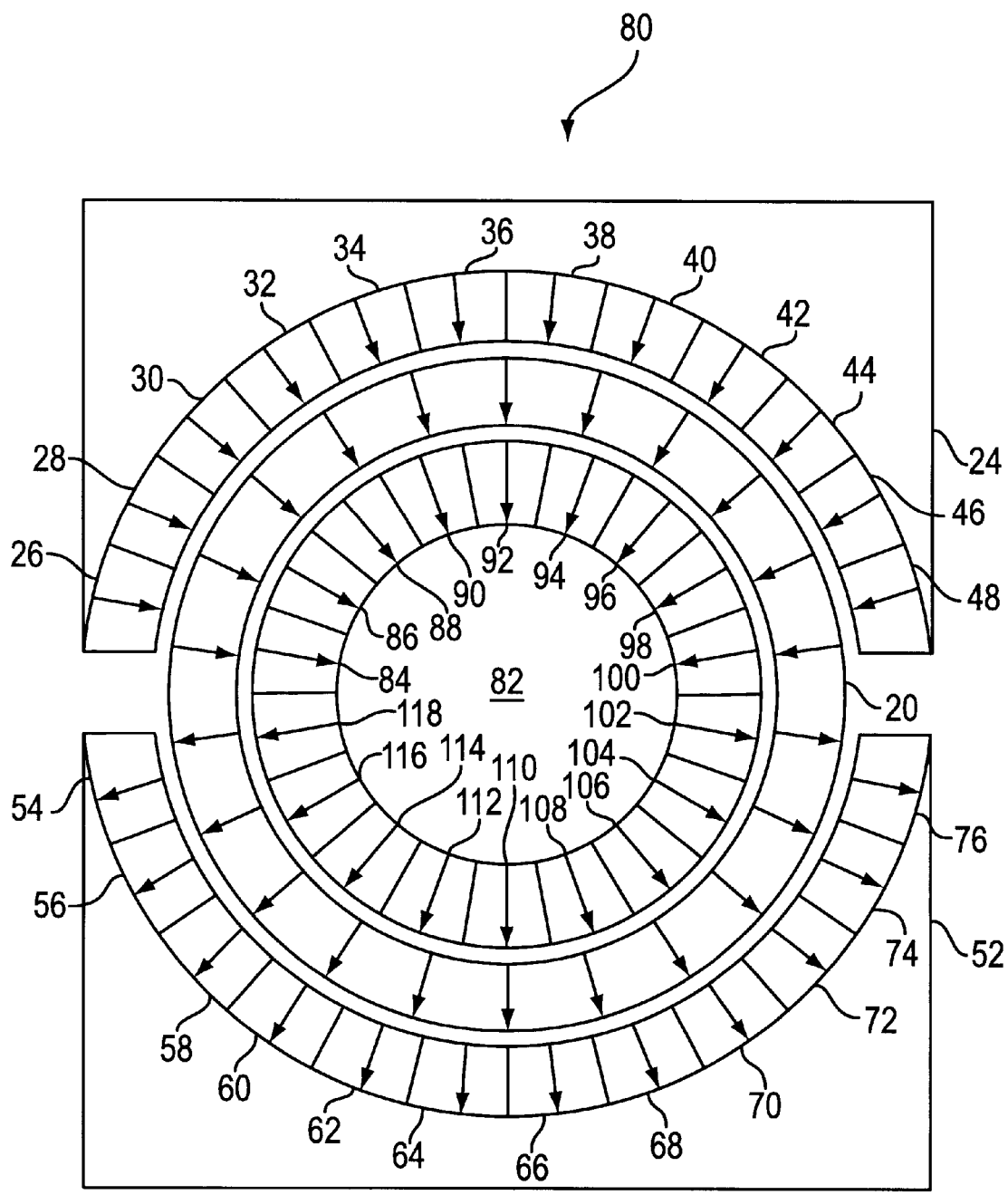
FIG. 6 is an illustration of the magnetizing flux lines of the radial magnetizing device of FIG. 5.

FIG. 6 is an illustration of the magnetizing flux lines of the radially magnetizing device of FIG. 5. In this embodiment, the radial magnetization is illustrated even more clearly than the previous embodiments. Flux lines travel between each of the individual magnets 26–48 of magnet assembly 24 and individual magnets 84–100 of central magnet assembly 82 and between individual magnets 54–76 of magnet assembly 53 and individual magnets 102–118 of central magnet assembly 82.

As indicated in conjunction with FIG. 2, pipe 20 may be any non-conductive pipe currently in use in the art. However, in this embodiment as with the previous embodiments, pipe 20 is preferably recently extruded plastic pipe with a ceramic ferrite content of anywhere from one to twenty four percent by weight and the ceramic ferrite is preferably either barium ferrite or strontium ferrite.

In the magnetization process, radially magnetizing device 80 is rotated either clockwise or counter-clockwise as pipe 20 is extruded providing a similar helical repetition pattern as previously described.

Figure 7:
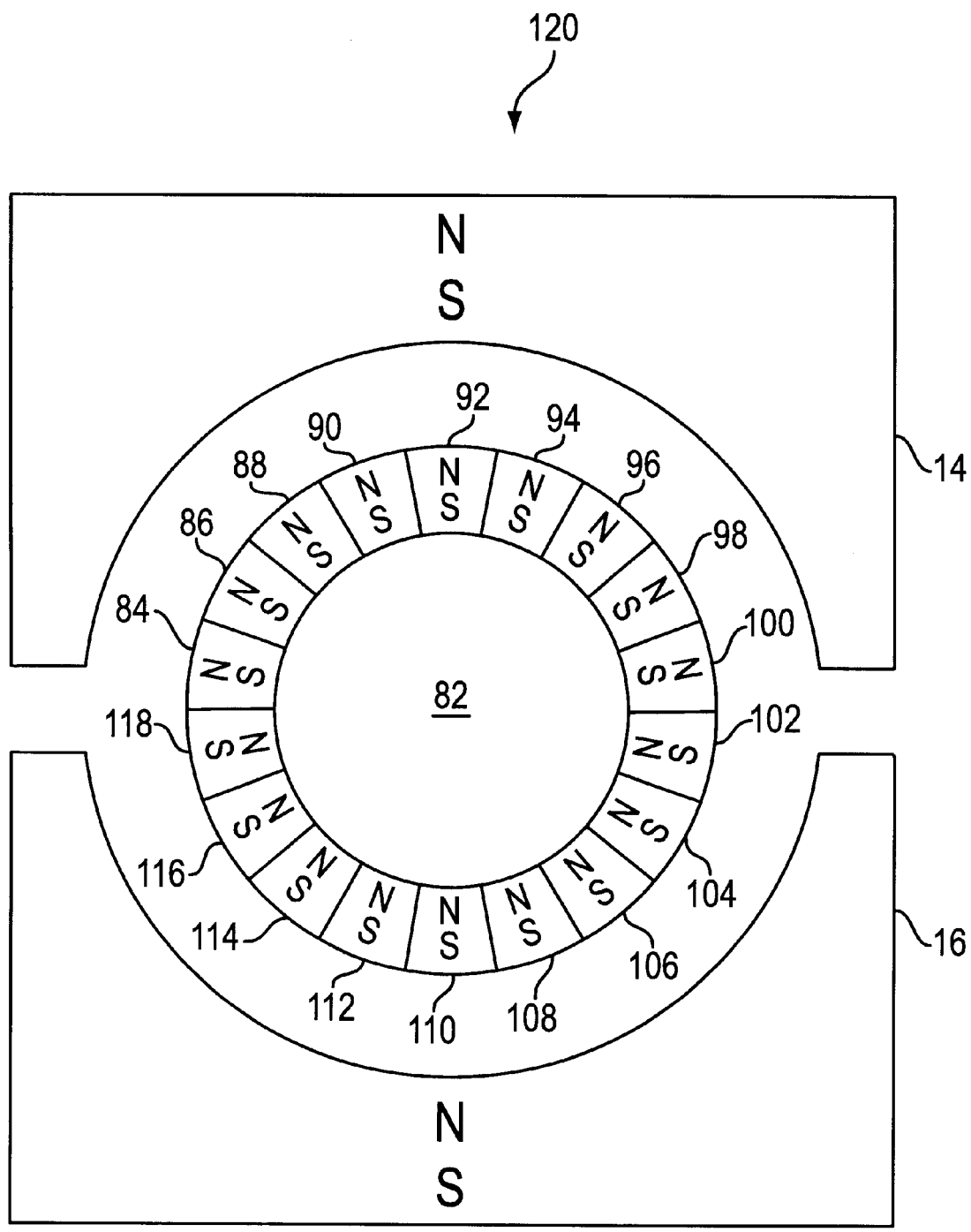
FIG. 7 is an end view of a fourth embodiment of a radial magnetizing device.

Referring now to FIG. 7, radial magnetizing device 120 is illustrated as having two fixed magnets 14 and 16 with central magnet assembly 82. In the preferred embodiment fixed magnets 14 and 16 are permanent magnets, and as stated in conjunction with FIG. 1, electromagnets may be used. If electromagnets are used the previously described modifications to the arrangement may be necessary. For example, slip rings for rotation and capacitors to charge up to provide the necessary power may be required. As described in connection with FIG. 5 central magnet assembly 82 has a plurality of individual magnets 84–118 with the first nine individual magnets, 84–100, having their north pole facing outward and the second nine individual magnets, 102–118, have their south pole facing outward. This arrangement is preferred, however, different numbers of individual magnets may be used as long as the pole designations are compatible with the opposing poles on fixed magnets 14 and 16.

The magnetizing flux lines of the radial magnetizing device of FIG. 7 are similar to the previous embodiments and are not illustrated for the sake of brevity. In this embodiment, flux lines travel between fixed magnet 14 and individual magnets 84–100 of central magnet assembly 82 and between fixed magnet 16 and individual magnets 102–118 of central magnet assembly 82.

As indicated in conjunction with the previous embodiments, pipe 20 may be any non-conductive pipe currently in use in the art and is preferably recently extruded plastic pipe with a ceramic ferrite content of anywhere from one percent to twenty four percent by weight and the ceramic ferrite is preferably either barium ferrite or strontium ferrite.

In the magnetization process, radially magnetizing device 80 is rotated either clockwise or counter-clockwise as pipe 20 is extruded providing a similar helical repetition pattern as previously described. As is illustrated in FIG. 12, rotation of device 80 as pipe 20 advances through it produces a magnetic field in the pipe having two alternating, helically arranged sectors. In one of those sectors 141 the north magnetic pole faces out, and in the other sector 143 the north magnetic pole faces in. The magnetic fields of those two sectors wind in a helical pattern around the exterior of the pipe, periodically concluding a complete revolution.

Figure 8:
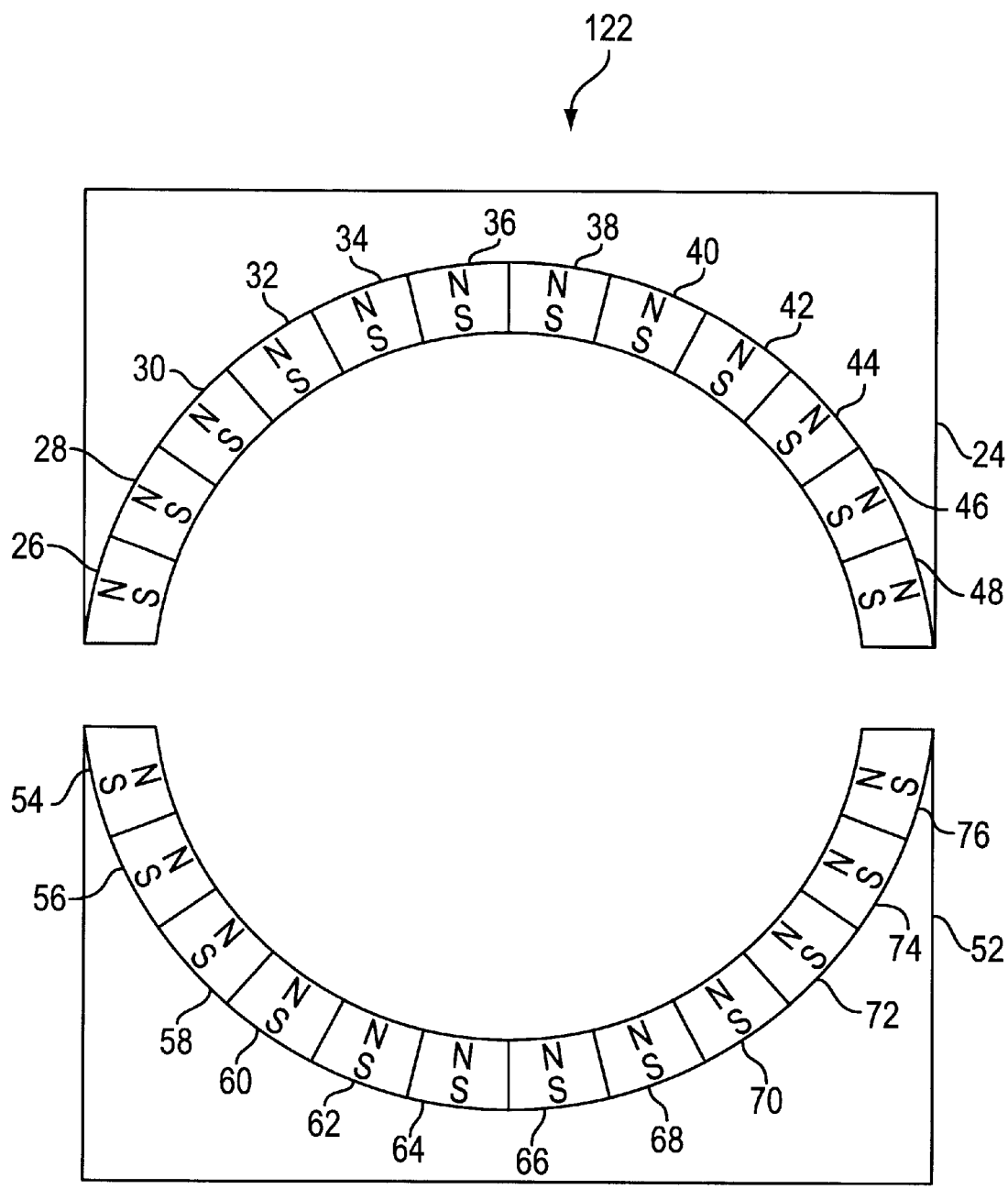
FIG. 8 is an end view of a fifth embodiment of a radial magnetizing device.

Referring now to FIG. 8, an end view of an additional embodiment of a radial magnetizing device 122 is illustrated as having a fixed magnet assembly 24 with a plurality of permanent magnets 26 through 48 and fixed magnet assembly 52 with a plurality of permanent magnets 54 through 76. In this embodiment, no central magnet is used since the segmented magnet assemblies 24 and 52 provide the magnetizing flux to provide radial magnetization for pipe 20.

Fixed magnet assembly 24 and fixed magnet assembly 52 are both illustrated as having twelve individual magnets per assembly. although this is the preferred arrangement, any number may be used as long as it provides sufficient flux strength to accomplish magnetization of the ceramic ferrite in pipe 20. Additionally, the number of individual magnets in assembly 24 may be different from the number of individual magnets in assembly 52, as long as the magnetization of pipe 20 can be effected.

Figure 9:
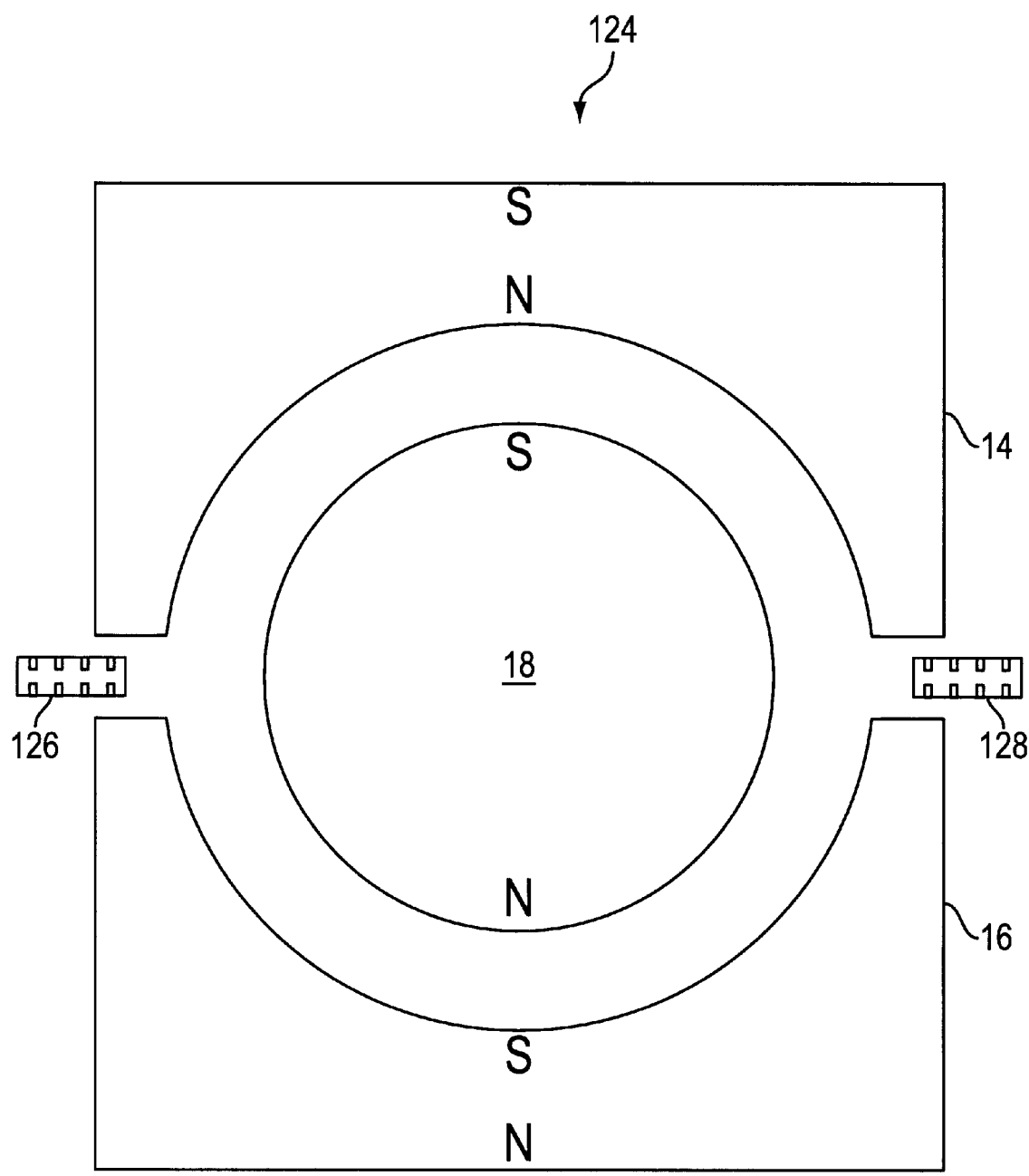
FIG. 9 is an end view of the radial magnetizing device of FIG. 1 with transition defining magnets in place.

Referring now to FIG. 9, a side view of radial magnetizing device 124 is illustrated as having two fixed magnets 14 and 16 with a central floating magnet 18 with transition defining magnets 126 and 128 in place. The operation and configuration of radial magnetizing device 124 is similar to that of radial magnetizing device 12 with the exception of the transition defining magnets.

Figure 10:
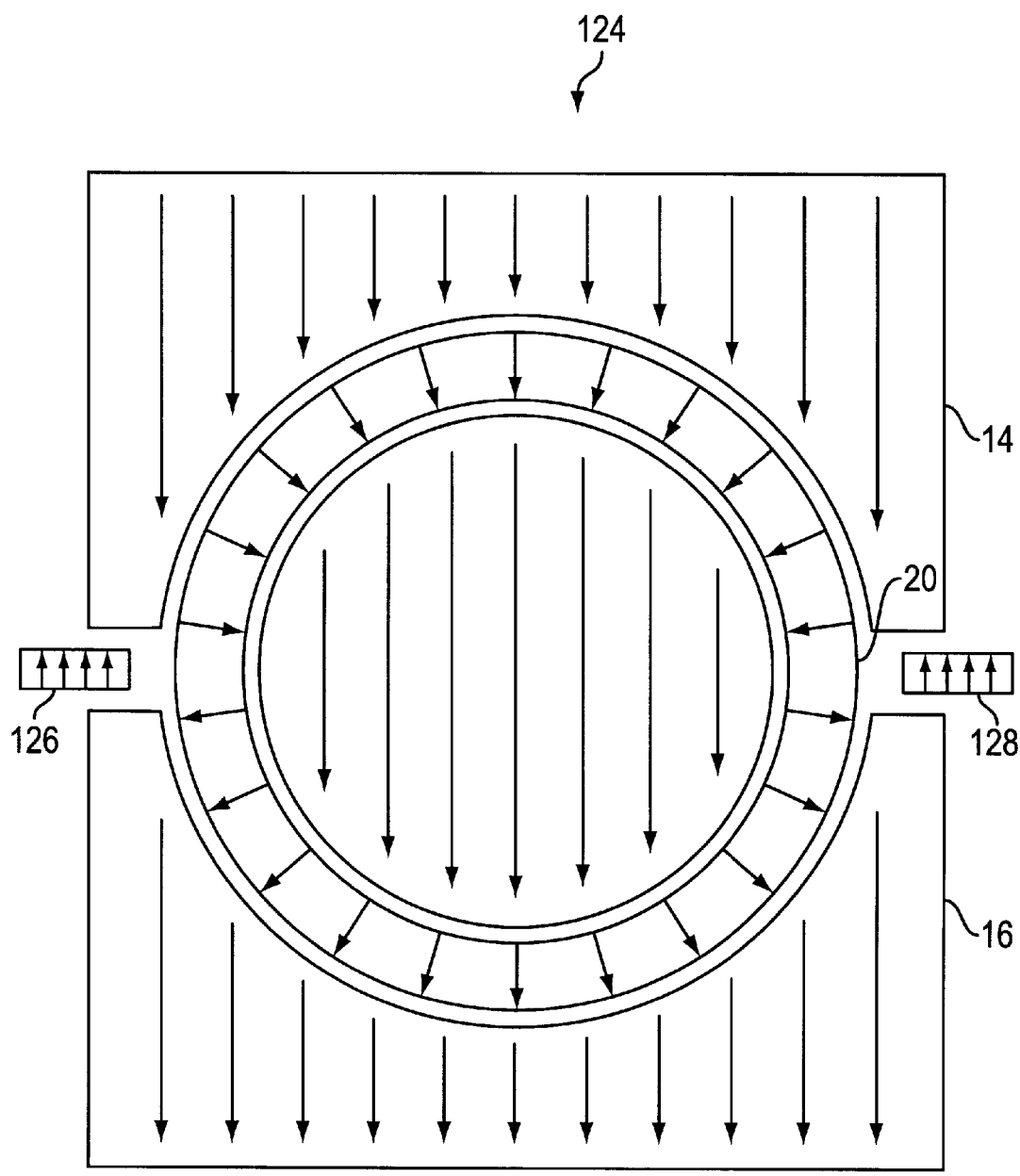
FIG. 10 is an illustration of the magnetizing flux lines of the radial magnetizing device of FIG. 7.

In FIG. 10 the flux lines of the radial magnetization system of FIG. 9 are illustrated as operating on pipe 20. As previously described, flux lines travel between fixed magnets 14 and 16 and central floating magnet 18. At the point where fixed magnets 14 and 16 are closest to each other, fringing occurs and the flux lines bend around the edges. In the magnetization of pipe 20, this is the point that the transition, where the north pole switches to the south pole, occurs. Transition defining magnets 126 and 128 force the fringing flux lines in so that magnetization of pipe 20 occurs more definitely.

In the magnetization process, radially magnetizing device 124 is rotated either clockwise or counter-clockwise as pipe 20 is extruded providing a similar helical repetition pattern as previously described.

Figure 11:
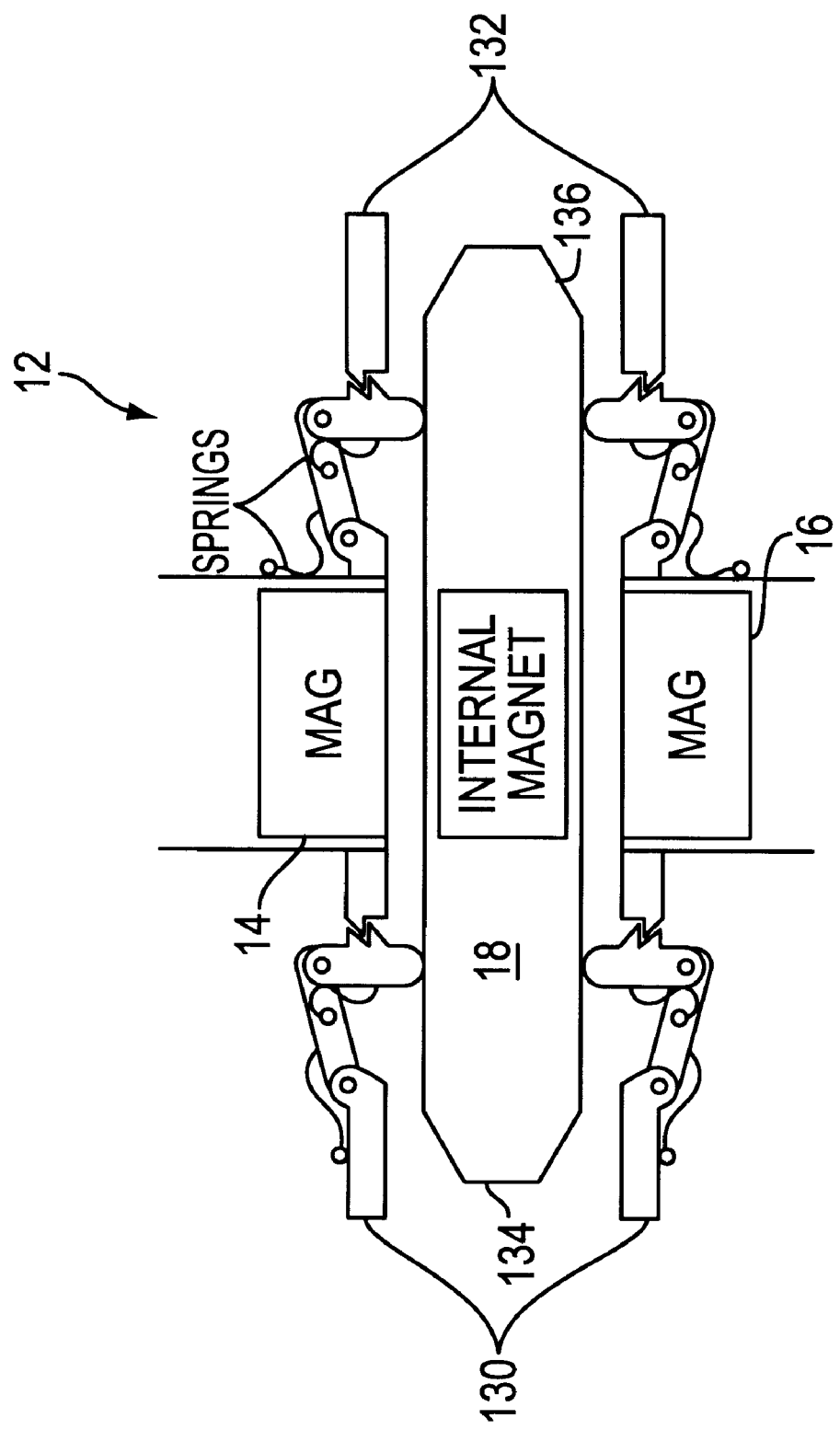
FIG. 11 is a plan side view of the radial magnetizing device of FIG. 1.

FIG. 11 is a side view of a radial magnetizing device of FIG. 1 with centering devices 130 and 132. Centering devices 130 and 132 are illustrated as attached to fixed magnets 14 and 16 and maintain the position of central floating magnet 18. Central floating magnet 18 is illustrated as having beveled ends 1345 and 136. This is to facilitate insertion of pipe 20. In the ideal world, the magnetic attraction of fixed magnets 14 and 16 would be equal and central floating magnet 18 would stay exactly in the middle between the fixed magnets. However, the present invention operates in the real world and central floating magnet 18 is attracted to either fixed magnet 14 or fixed magnet 16. Beveled ends 134 and 136 provide the necessary space for pipe 20 to fit in the generally annular space defined by fixed magnets 14 and 16 and central floating magnet 18. centering devices 130 and 132 are not necessary if the end segment of the pipe extrusion is left in the radial magnetizing device. Also, it is apparent that centering devices 130 and 132 are not necessary with the embodiment illustrated in FIG. 8.

As described, the present invention provides a method and apparatus for polarizing ceramic ferrite in a non-conductive pipe. The method includes providing two oppositely polarized magnets, each having an arcuate shaped side facing each other to form a generally circular opening. A permanent magnet is suspended within the generally circular opening so that the permanent magnet does not come in contact with the two oppositely polarized magnets. In this manner an annular space is formed between the generally circular opening and the suspended permanent magnet. A non-conductive pipe is passed through the annular space. The apparatus for polarizing ceramic ferrite in a non-conductive pipe includes two oppositely polarized magnets, each having an arcuate shaped side facing each other to form a generally circular opening. A permanent magnet is placed within the generally circular opening so that the permanent magnet does not come in contact with the two oppositely polarized magnets thus forming an annular space therebetween. A centering device associated with the permanent magnet is provided to permit non-conductive pipe to pass through the annular space with the permanent magnet within the non-conductive pipe.

An apparatus for centering a permanent magnet between two oppositely polarized fixed magnets has also been disclosed. This apparatus includes a hinge extending from one side of each of the two fixed magnets. An arm is connected to the hinge at one end, this arm having a first biasing member pushing the arm away from the fixed magnet. A spacer device is connected to another end of the arm. The spacer device is in contact with the permanent magnet to position the permanent magnet with respect to the fixed magnets. The spacer device has a second biasing member pushing the spacer from the arm. A second hinge extends from another side of each of the two fixed magnets. A spacer arm is connected to the second hinge. The spacer arm has a first end for positioning the permanent magnet with respect to the fixed magnets. The spacer arm has a third biasing member pushing a second end of the spacer arm from the fixed magnet to which the hinge is attached.

A magnetically identified non-conductive pipe is produced using the method and apparatus for polarizing ceramic ferrite in a non-conductive pipe. The non-metallic pipe contains a predetermined percentage by weight of a ceramic ferrite. The ceramic ferrite is polarized radially in the pipe. The radial polarization has one half north poles facing in and one half south poles facing in. The poles wind around the exterior of the pipe, periodically concluding a complete helix.

While there has been illustrated and described a particular embodiment of the present invention, it will be appreciated that numerous changes and modifications will occur to those skilled in the art, and it is intended in the appended claims to cover all those changes and modifications that fall within the true spirit and scope of the present invention.

I claim:

1. A magnetically detectable plastic pipe containing between 1% and 24% by weight of a ceramic ferrite, said ceramic ferrite magnetically polarized radially in said pipe around substantially its entire circumference, said radial polarization having one sector with the north magnetic pole facing out and another sector with the north magnetic pole facing in, said sectors winding in a helical pattern around the exterior of the pipe, periodically concluding a complete revolution.

2. The magnetically detectable plastic pipe of claim 1 wherein said ceramic ferrite is selected from the group consisting of barium ferrite, strontium ferrite, and mixtures thereof.

3. The magnetically detectable plastic pipe of claim 1 wherein said helical pattern is repeated about every twelve feet of pipe length.

4. The magnetically detectable plastic pipe of claim 1 wherein said ceramic ferrite is barium ferrite.

5. The magnetically detectable plastic pipe of claim 4 wherein the amount of said barium ferrite contained in the pipe is approximately 12% by weight.

6. The magnetically detectable plastic pipe of claim 1 wherein said plastic is polyethylene.

7. The magnetically detectable plastic pipe of claim 1 wherein said ceramic ferrite is strontium ferrite.

8. The magnetically detectable plastic pipe of claim 7 wherein the amount of said strontium ferrite contained in the pipe is approximately 12% by weight.

* * * * *